United States Patent [19]

Porter

[11] Patent Number: 6,130,670
[45] Date of Patent: Oct. 10, 2000

[54] METHOD AND APPARATUS FOR PROVIDING SIMPLE GENERALIZED CONSERVATIVE VISIBILITY

[75] Inventor: Brandon Porter, Skaneateles, N.Y.

[73] Assignee: Netscape Communications Corporation, Mountain View, Calif.

[21] Appl. No.: 08/902,433

[22] Filed: Jul. 29, 1997

Related U.S. Application Data

[60] Provisional application No. 60/038,668, Feb. 20, 1997.

[51] Int. Cl.[7] .............................. G06T 15/40; G06T 15/30
[52] U.S. Cl. ............................................. 345/421; 345/434
[58] Field of Search ...................................... 345/421, 426, 345/428, 431, 434

[56] References Cited

U.S. PATENT DOCUMENTS

| | | | |
|---|---|---|---|
| 3,816,726 | 6/1974 | Sutherland et al. | 345/425 |
| 5,249,264 | 9/1993 | Matsumoto | 345/434 |
| 5,428,716 | 6/1995 | Brokenshire et al. | 345/421 |
| 5,748,867 | 5/1998 | Cosman et al. | 345/430 |
| 5,926,182 | 7/1999 | Menon et al. | 345/421 |

OTHER PUBLICATIONS

Coorg et al., "A Spatially and Temporally Coherent Object Space Visibility Algorithm", Synthetic Imagery Group, MIT Laboratory for Computer Science.

Coorg et al., Temporally Coherent Conservative Visibility* (Extended Abstract), Synthetic Imagery Group, MIT Laboratory for Computer Science.

Coorg et al., "Real–Time Occlusion Culling for Models with Large Occluders", In Proc. 1997 ACM Symposium on Interactive 3D Graphics, pp. 83–90 and 189.

Luebke et al, "Portals and Mirrors: Simple, Fast Evaluation of Potentially Visible Sets", http://www.cs.unc.edu/luebke/publications/portals.html.

Schmalstieg et al, "On System Architectures for Virtual Environments" http://www.cg.tuwien.ac.at/–dieter/publications/bratislava95.html.

Roehl, "Adding Regions to VRML", http://ece.uwaterloo.ca/–broehl/vrml/regions.html.

Primary Examiner—Mark R. Powell
Assistant Examiner—Thu Nguyen
Attorney, Agent, or Firm—Michael A. Glenn

[57] ABSTRACT

Occluder nodes, which are planes with given width and height in object space that block the rendering of objects behind them in world space, are used to compute a conservative set of visible objects from a current viewpoint. Occluder nodes can be incorporated by scene designers and authoring tools to perform many high performance rendering techniques, including culling geometry in densely occluded models, region based scene division, and using images to represent far distant geometry. Using this simple primitive, generalized scene viewers are provided that allow interactive rendering of complex worlds, including multiuser environments, architectural models, three dimensional games, and large engineering models.

48 Claims, 15 Drawing Sheets

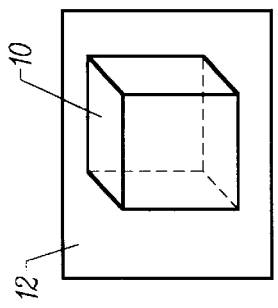
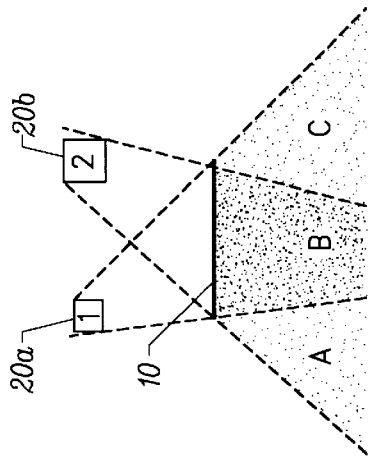
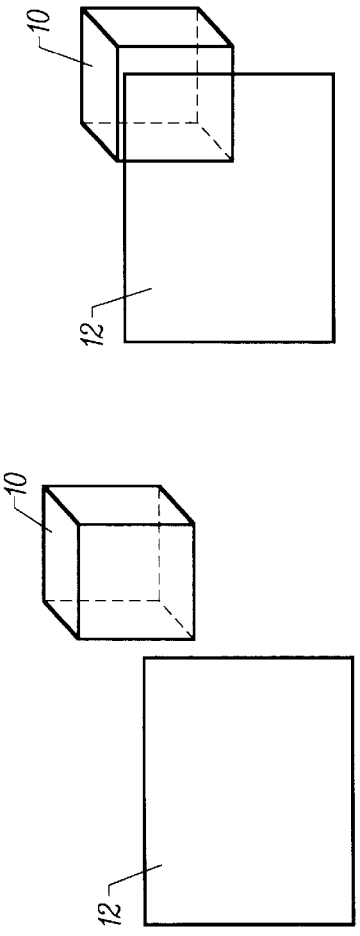
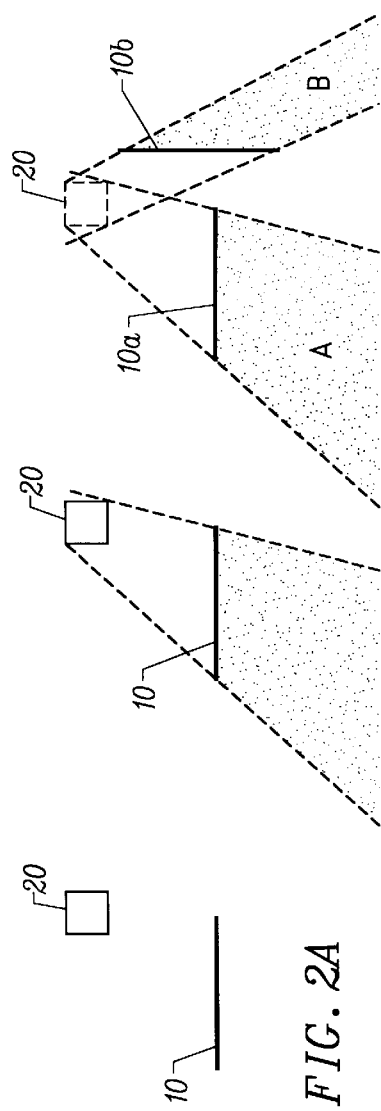

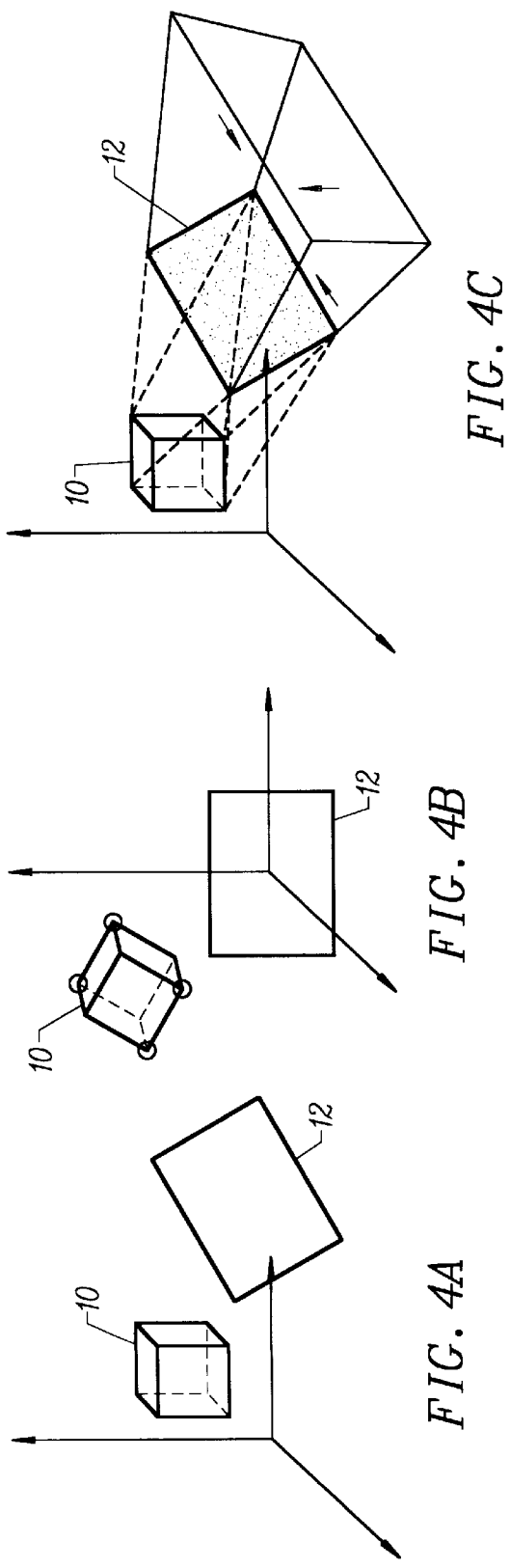

METHOD AND APPARATUS FOR PROVIDING SIMPLE GENERALIZED CONSERVATIVE VISIBILITY

This application claims the benefit of U.S. Provisional No. 60/038,668 filed Feb. 20, 1997.

BACKGROUND OF THE INVENTION

1. Technical Field

The invention relates to image rendering. More particularly, the invention relates to a method and apparatus for providing simple generalized conservative visibility.

2. Description of the Prior Art

Today, the performance of many generalized software based rendering engines does not meet the needs of designers who are attempting to implement complex scenes.

Limitations of VRML

Many application specific high performance rendering engines achieve high performance rendering by restricting the types of scene interaction. The game Doom, for example, does not allow players to look up at the ceiling or down at the floor. Others, such as the UC Berkeley WalkThru System, rely on compute intensive visibility preprocessing based on static elements in the scene (see S. Teller, *Visibility Computations in Densely Occluded Polyhedral Environments*, Ph.D. dissertation, University of California at Berkeley, (1992); and S. Teller, C. H. Séquin, *Visibility Preprocessing for Interactive Walkthroughs*, Computer Graphics (Proc. Siggraph '91) 25, 4, pp. 61–69 (1991)). Applying these techniques in VRML 2.0 viewers, requires placing severe constraints on VRML designers.

The generality of VRML scenes makes devising simple, effective visibility algorithms difficult. VRML 2.0 places few constraints on the scene designers. Consequently, any visibility algorithm must be generalizable. Objects in VRML 2.0 can also be added, removed, and transformed through the use of an external interface (such as Java and JavaScript). This means that no object is truly static. A good visibility algorithm for VRML scenes cannot rely on assumptions about static elements in the scene. Many current VRML viewers rely on third party rendering engines to perform the low level rendering of the objects, limiting the viability of algorithms that use such techniques as polygon splitting or merging. Consequently, algorithms that increase rendering performance must do the majority of their work before the low level rendering calls are performed.

Conservative Visibility

Fundamentally, representing a three dimensional image is a matter of determining which objects are visible from the current viewpoint. Many algorithms use an object or polygon list to determine which object or polygon appears in front of other elements in the scene. The performance of these algorithms is related to the number of elements in the list. Complex scenes can have thousands of objects and millions of polygons. Thus, quickly reducing the number of elements in this list by removing elements that are not visible can greatly improve the rendering performance.

Effective conservative visibility algorithms attempt to cull a large number of elements from the scene quickly. A visibility algorithm is considered conservative if it overestimates the number of visible elements, generating a conservative set instead of an exact set of visible elements (see S. Coorg, S. Teller, *A Spatially and Temporally Coherent Object Space Visibility Algorithm*, Tech. Re. TM-546, Laboratory for Computer Science, MIT, (1996); and S. Coorg, S. Teller, *Temporally Coherent Conservative Visibility*, Twelfth Annual ACM Symposium on Computational Geometry (1996)).

A typical conservative visibility algorithm identifies a superset of the visible polygons. The standard rendering subsystem is left with the task of determining the exact rendering of the scene given the reduced set of visible elements. By using this system, the hardware or software optimizations used by the underlying rendering subsystem, such as hardware Z-buffering, are preserved.

The computational time necessary to perform the conservative visibility algorithms must be less than the time necessary to apply the underlying rendering subsystem to the culled elements. Consequently, conservative visibility algorithms are especially useful when they can generate a reasonably tight upper bound on the number of elements in the scene.

It would be advantageous to provide an approach that meets all of the above constraints without requiring computationally expensive initialization routines, intensive precomputation, large amounts of memory, or highly specialized data structures.

SUMMARY OF THE INVENTION

The invention provides an occluder primitive and a simple associated algorithm that greatly improves the rendering performance of large scenes. Because this algorithm works on both polygons and objects, the term "elements" is used herein to represent either polygons and/or objects. The occluder primitive and associated algorithm are simple to implement in three dimensional viewers and highly generalizable. For example, the presently preferred embodiment of the invention is readily implemented in a VRML 2.0 viewer.

Occluder nodes, which are planes with given width and height in object space that block the rendering of objects behind them in world space, are used to compute a conservative set of visible objects from a current viewpoint. Occluder nodes can be incorporated by scene designers using authoring tools to perform many high performance rendering techniques, including culling geometry in densely occluded models, region based scene division, and using images to represent far distant geometry. Using this simple primitive, generalized scene viewers are provided that allow interactive rendering of complex worlds, including multi-user environments, architectural models, three dimensional games, and large engineering models.

Accordingly, the invention provides an algorithm based on occluders that allows general three dimensional viewers to support complex worlds better, including multi-user environments, games, architectural walkthroughs, and large engineering models. The algorithm does not require an extensive preprocessing step, computationally expensive per frame operations, or excessive memory requirements. The algorithm performs all of its work before the underlying rendering engine is called. This supports viewers that use third party rendering engines, or performance enhanced low level rendering engines. Occluders do not require objects in the scene to be static, and the algorithm is sufficiently generalizable to many three dimensional applications.

BRIEF DESCRIPTION OF THE DRAWINGS

FIG. 1a is a schematic diagram that illustrates a bounding box that is completely unobstructed by an occluder according to the invention;

FIG. 1b is a schematic diagram that illustrates a bounding box that is partially occluded according to the invention;

FIG. 1c is a schematic diagram that illustrates a bounding box that is completely occluded by an occluder according to the invention;

FIG. 2a is a schematic diagram that illustrates a two dimensional bounding square, and the location of an occluder according to the invention;

FIG. 2b is a schematic diagram that illustrates bounding lines, where a gray area demarks the area in which an object is occluded according to the invention;

FIG. 2c is a schematic diagram that illustrates two occluders in a scene according to the invention;

FIG. 2d is a schematic diagram that illustrates bounding areas for two different squares according to the invention;

FIG. 4a is a schematic diagram that illustrates a bounding box, and the location of an occluder, shown as a transparent plane according to the invention;

FIG. 4b is a schematic diagram that illustrates a scene that has been transformed into occluder space according to the invention;

FIG. 4c is a schematic diagram that illustrates bounding planes in world space as calculated to form the occlusion volume according to the invention;

DETAILED DESCRIPTION OF THE INVENTION

Figure 3:
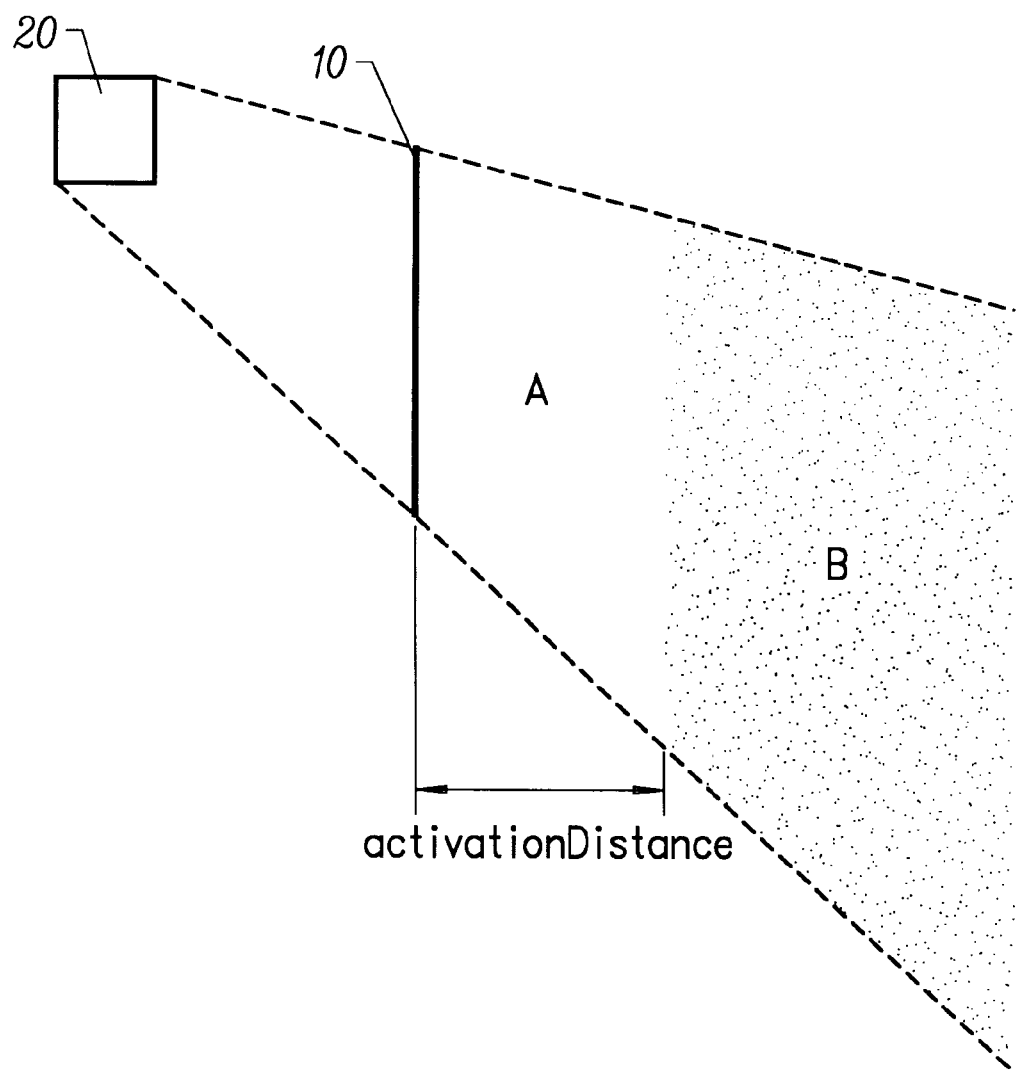
FIG. 3 is a schematic diagram that illustrate the activationDistance field in the occluder, which specifies how far the camera must be from the occluder for the occluder to be active, according to the invention.

The invention provides an occluder primitive and a simple associated algorithm that greatly improves the rendering performance of large scenes. Because this algorithm works on both polygons and objects, the term "elements" is used herein to represent either polygons and/or objects. The occluder primitive and associated algorithm are simple to implement in three dimensional viewers and highly generalizable. For example, the presently preferred embodiment of the invention is readily implemented in a VRML 2.0 viewer.

Occluder nodes, which are planes with given width and height in object space that block the rendering of objects behind them in world space, are used to compute a conservative set of visible objects from a current viewpoint. Occluder nodes can be incorporated by scene designers and authoring tools to perform many high performance rendering techniques, including culling geometry in densely occluded models, region based scene division, and using images to represent far distant geometry. Using this simple primitive, generalized scene viewers are provided that allow interactive rendering of complex worlds, including multi-user environments, architectural models, three dimensional games, and large engineering models.

Accordingly, the invention provides an algorithm based on occluders that allows general three dimensional viewers to support complex worlds better, including multi-user environments, games, architectural walkthroughs, and large engineering models. The algorithm does not require an extensive preprocessing step, computationally expensive per frame operations, or excessive memory requirements. The algorithm performs all of its work before the underlying rendering engine is called. This supports viewers that use third party rendering engines, or performance enhanced low level rendering engines. Occluders do not require objects in the scene to be static, and the algorithm is sufficiently generalizable to many three dimensional applications.

The following discussion first presents a basic conservative visibility algorithm in accordance with a presently preferred embodiment of the invention. Second, a description is provided of how occluder nodes can be used to create compelling complex worlds. Lastly, results from the presently preferred implementation are examined, and other embodiments of the invention are discussed.

Basic Conservative Visibility Algorithm

The algorithm herein described uses object bounding boxes and occluder nodes to perform visibility testing. Objects correspond to VRML 2.0 Shapes, such as Spheres, Cubes, and IndexedFaceSets. Occluder nodes can be described as a plane in world space with a given center, width, height, and normal. If an object lies in the positive half space of the occluder node, and the entire object bounding box lies within the area of the occluder in eye space, then the object is considered occluded.

The foregoing can be defined as follows:

An object is not visible from the camera position if and only if all the vertices of its bounding box are occluded by a single occluder node in camera space.

Each object's bounding box can exist in three states relative to an occluder. The bounding box 12 can be completely unobstructed by the occluder 12 (FIG. 1a), in which case the object is visible. Changing the viewpoint can cause the bounding box 10 to be partially occluded by the occluder 12 (FIG. 1b). Currently, the preferred embodiment of the invention does not use information about partial occlusion, although algorithms that take advantage of partial occlusion have been developed (see S. Coorg, S. Teller, *A Spatially and Temporally Coherent Object Space Visibility Algorithm*, Tech. Re. TM-546, Laboratory for Computer Science, MIT, (1996); and S. Coorg, S. Teller, *Temporally Coherent Conservative Visibility*, Twelfth Annual ACM Symposium on Computational Geometry (1996)). Finally, the bounding box 10 can be completely occluded by the occluder 12 (FIG. 1c). This last example matches the above definition. Therefore, the object is not visible to the camera.

The following discussion explains occluder nodes and the implementation of the algorithm in more detail.

Geometry of an Occluder Node

Spatially an occluder node in object space is a plane centered at coordinate 0,0,0 with a given width and height. An occluder's normal is in the positive-Z direction in VRML's right handed coordinate system. The following VRML 2.0 prototype describes the fields in an occluder node:

EXTERNPROTO Occluder [
  exposedField SFBool active
  field SFFloat height
  field SFFloat width
  field SFFloat activationDistance
]

The occluder has a Boolean field which controls whether or not the occluder is active in the scene. The Boolean field can be exposed to an external interface to control which occluders are active. By default the occluder is active. Inactive occluders have no affect on the scene.

The height and width fields specify the dimensions of the occluder plane and are set at 1.0 unit by default. The activationDistance field specifies how far the camera must be from the occluder for the occluder to be active. This means that when the camera gets close enough to the occluder, the geometry behind the occluder becomes visible. By default, the activation distance is set at 0.0 units, meaning the occluder is always active.

The VRML prototype for an occluder is:
EXTERNPROTO Occluder [
  field SFFloat height
  field SFFloat width
  exposedField SFBool active
]

Any affine transformation can be applied to an occluder. Consequently, occluders can be transformed to any position in world space. For purposes of the discussion herein, the result of applying a non-affine transformation to an occluder is unspecified.

For purposes of the discussion herein, an affine transformation is a transformation of the form:

$$x'=a_1x+b_1y+c_1, y'=a_2x+b_2y+c_2 \quad (1)$$

where $a_1b_2-a_2b_1=0$. An affine transformation maps parallel lines into parallel lines, finite points into finite points, leaves the line at infinity fixed, and preserves the ratio of the distance separating three points that line on a straight line.

Simple occluder nodes have no visible geometry. They can, however, be placed coplanar with other geometry. For instance, a designer can place an occluder coplanar with a wall. This allows designers to add occluder nodes to scenes after the scene has been completely designed without changing the visual appearance of the scene.

Occluders also have global scope relative to the scene. Any object at any distance from the occluder is deemed not visible if its bounding box is completely contained within the occluder relative to the camera. Because an occluder is one sided, only objects in the negative half space of the occluder can ever be occluded.

Algorithm Implementation

The algorithm herein described is most easily understood by first examining it in two dimensions and extending the concepts to three dimensions. FIG. 2 presents the two dimensional case. The occluder 10 is represented as a one dimensional line, and the object 20 as a two dimensional bounding square (FIG. 2a). First, the bounding lines between the occluder and the object are calculated. The intersection of the area on the opposite side of the occluder from the object and the area in between the bounding lines (shown in gray) represents the area in which the object is fully occluded (FIG. 2b). If the camera is in this region, the object is not visible to the camera and should not be rendered. This simple algorithm can be extended to multiple occluders 10a, 10b (FIG. 2c), and multiple objects 20a, 20b (FIG. 2d). If the observer is located in region A, object 2 is not visible. If the observer is located in region C, object 1 is not visible. Region B is the intersection of these two areas and denotes the region in which both objects are occluded.

The activationDistance field in the Occluder specifies how far the camera must be from the occluder for the occluder to be active. The two dimensional case for this is shown in FIG. 3. In this example, when the observer is in region B, the object 20 represented by the bounding square is marked as not visible. When the observer comes closer to the occluder 10 and enters region A, the occluder becomes inactive and the object is marked visible.

Extending this algorithm to three dimensions, it is first necessary to calculate the bounding planes instead of bounding lines. The bounding planes form the bounding volume in which the object is occluded, which is referred to herein as the occlusion volume. Second, it is necessary to test if the camera is inside an occlusion volume associated with an object. If so, then that object not visible to the camera and should not be rendered.

Calculating the bounding volume requires transforming all objects from world space coordinates (FIG. 4a) into the coordinate space relative to the occluder. In occluder space coordinates, the minimum and maximum x and y vertices of the bounding box 10 are located (FIG. 4b). Then, the vertex corresponding to the maximum y value in occluder space and the top edge of the occluder 12 form a plane in world space coordinates. The minimum x vertex and the left edge create the left bounding plane. The minimum y vertex and the bottom edge create the bottom bounding plane. The maximum x vertex and the right edge create the left bounding plane. These four planes combined with the occluder itself comprise the bounding walls of the occlusion volume. An occlusion volume can be either a pyramid in the case where the bounding planes intersect in the positive half space of the occluder, or an infinite prism if the bounding planes do not intersect.

The center of the occluder (FIG. 4b) is location 0,0,0. The circled vertices represent the extrema of the bounding cube in occluder space. Using these extrema, the bounding planes in world space are calculated to form the occlusion volume shown in FIG. 4c. The occlusion volume extends to infinity along the direction of the occluder normal. FIG. 4c illustrates an occlusion volume with bounding planes that do not intersect.

For each occluder in the scene, the normals representing the occlusion volume must be stored with the object. This is accomplished by associating a linked list of bounding volume normals with each shape node in the scene graph. To locate occluders quickly, a linked list is created of pointers to occluder nodes in the scene graph. In the event that an object moves, its occlusion volumes must be recalculated. This is not a compute intensive task.

To determine whether or not an object is visible, it is only necessary to traverse the scene graph and find each object containing a set of occlusion volumes. Then, the algorithm loops through each of the occlusion volumes. If the camera is inside one of the occlusion volumes (if the camera position is in the positive half space of the occluder, top, left, bottom, and right planes), then the object is not visible and the visibility is set to false, and the algorithm returns to a starting position.

This algorithm can be represented by the following pseudo-code:

```
for each object in scene graph do
    object.visible = true
    if object.volumes != NULL then
        for each occlusion_volume in object do
            if distance(camera_position, occluder) < 0 then
                continue
            if distance(camera_position, top_bounding_plane) < 0
                then continue
            if distance(camera_position, left_bounding_plane) < 0 then
                continue
            if distance(camera_position, bottom_bounding_plane) < 0 then
                continue
            if distance(camera_position, right_bounding_plane) < 0 then
                continue
            object.visible = false
            return
        next
        endif
next
```

In summary, the algorithm herein first computes each occlusion volume, i.e. the volume in which the camera cannot see the object because it is blocked by an occluder, as a onetime initialization process at run time. For each frame, the algorithm loops over all of these volumes. If the camera is inside an occlusion volume, then the object associated with that occlusion volume is not visible.

Algorithm Analysis

Unlike traditional algorithms, the performance of the algorithm herein described can be optimized by the designer of the world by altering the number of occluder nodes in a scene. For each frame rendered, the algorithm must analyze each object. For each object, the algorithm must analyze each occluder in the scene. Thus, for each frame rendered, if:

$$p = \text{the number of occluder nodes}, \quad (2)$$

and $$n = \text{the number of objects in the scene}, \quad (3)$$

then, the overhead in time can be expressed as:

$$\text{Time required} = O(pn). \quad (4)$$

In the worst case, the algorithm must perform five dot products per O(pn) calculations. When the object is not occluded by the occluder, the algorithm performs fewer than five dot products on average.

The actual values for p and n in the equation for time required can be greatly reduced by first performing view frustum culling of the scene to remove occluder nodes and objects that are not visible from the viewpoint. At the same time, for each occluder, every object must store four vectors representing the normals of the bounding planes.

The overhead of the algorithm in space is therefore:

$$\text{Memory required} = O(pn). \quad (5)$$

The low time and memory requirements make this algorithm suitable for very large worlds.

Extensions to Simple Occluders

The algorithm described above provides exceptional performance and is an excellent solution for conservative visibility in general three dimensional viewers. In the following discussion, enhancements to this algorithm are described that further improve speed and provide more options to scene designers. These extensions are not as easily generalizable to any three dimensional viewer. The first extension described involves automatically generating and mapping a texture of the scene behind the occluder onto the face of the occluder. The second extension involves using hierarchical bounding boxes in the scene to take advantage of the spacial locality of objects to quickly determine their visibility.

Mapping a Texture onto an Occluder

Hierarchical rendering techniques that use texture maps to represent far distant geometry instead of rendering them have been used for interactive rendering of large open spaces (see R. W. Xiong, *A Stratified Rendering Algorithm for Virtual Walkthroughs of Large Environments,* M.S. Thesis, Massachusetts Institute of Technology, (1996)).

By automatically generating a texture of the geometry behind an occluder and mapping that texture to the surface of that occluder, it is possible to give designers the ability to take advantage of this technique. When the camera is closer to the occluder than the activationDistance, the occluder's texture is replaced by real geometry. Generation of these textures is accomplished by rendering the geometry behind of the occluder into an image buffer that is used as a texture for the occluder.

Hierarchical Bounding Boxes

For this extension, use is made of the fact that if a bounding box is occluded, then all bounding boxes which are completely inside the occluded bounding box are also occluded. At each grouping node in the scene graph, a bounding box is maintained that is the union of all the bounding boxes of the group node's progeny. Instead of only maintaining a set of normals comprising the occluder volumes for each object in the scene, the set of normals comprising the occluder volumes for the hierarchical bounding boxes at each group node in the tree are also maintained. Thus, if the bounding box at a parent node in the tree is occluded, then all of its progeny are also occluded. If the parent is not occluded, then the progeny are checked individually.

Figure 5B:
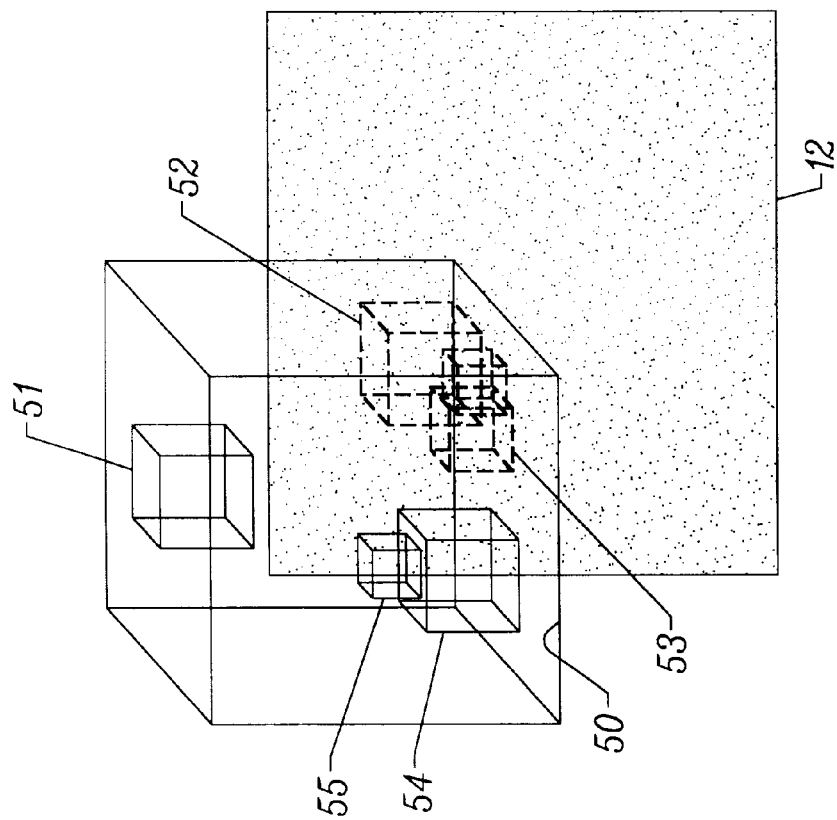
FIG. 5b is a schematic diagram that illustrates an example in which an accumulated bounding box is not fully occluded, such that certain elements within the bounding box are visible, according to the invention.
Figure 5A:
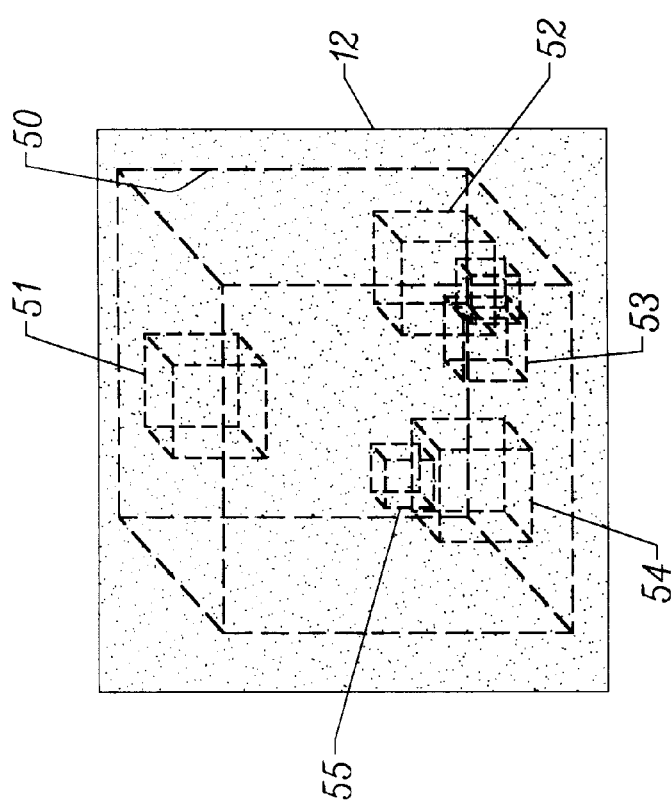
FIG. 5a is a schematic diagram that illustrates an example in which an occluder completely covers an outer accumulated bounding box, such that everything within the bounding box is occluded, according to the invention.

FIG. 5a shows a set of bounding boxes 51–55 enclosed in a parent bounding box 50. The gray area represents an occluder 12. It can be seen that if the occluder fully covers the outer bounding box, all of the progeny are marked as not visible and no further processing is performed.

FIG. 5b shows the same set of bounding boxes, but the camera position has moved such that the occluder does not fully cover the outer bounding box 50. Because the algorithm then extends to the progeny, it can be seen that the progeny that are still correctly marked are not visible. The algorithm thus checks the progeny and properly determines which of those that are not visible and which are visible.

This technique is especially effective in a scene in which an entire room is contained in one sub-graph of the scene graph. If that room is occluded by an occluder in the scene, all of the objects in the room are also occluded.

Practical Uses of Occluders

The following discussion presents three different methods for using occluders to achieve improved performance in complex worlds. These techniques highlight the flexibility of the single occluder primitive.

Place Occluders Coplanar with Static Objects

The easiest and perhaps most practical method for using occluders is to place occluders in the same position as objects that already block much of the scene. For instance, occluders could be placed along the walls of a room so that the geometry behind the walls is not rendered.

Figure 6A:
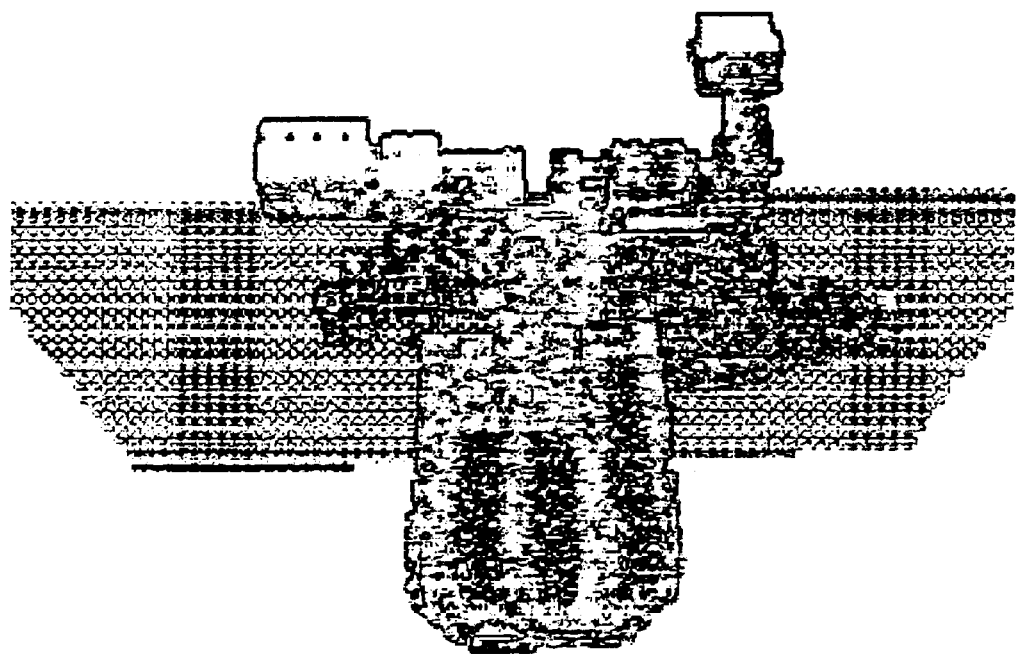
FIG. 6a is an image that illustrates Quake Start Level, in which the transparent plane highlights the location of an invisible occluder, and in which the occluder is not active and thus the geometry behind the occluder is visible according to the invention.
Figure 6B:
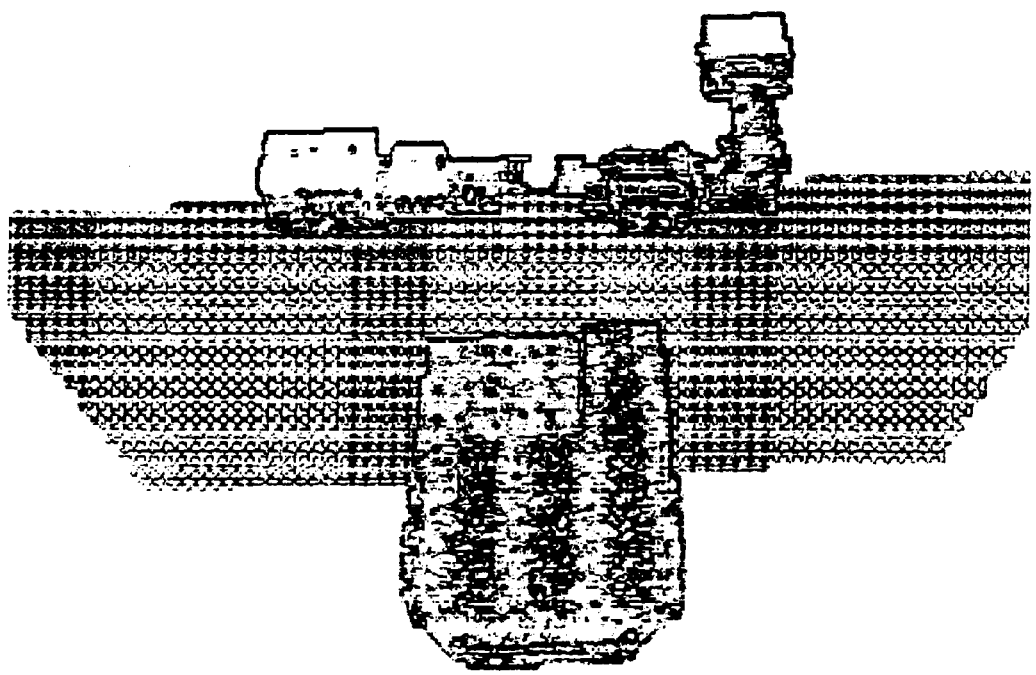
FIG. 6b is an image that illustrates an occluder that is active where the geometry behind the occluder is not visible according to the invention.

FIG. 6 shows this technique being used to render a VRML version of the first level of the Quake program. In FIGS. 6a and 6b, the occluder is highlighted as a transparent plane to give a sense of where the occluder is and how it culls the scene. The occluder itself is not visible. Because occluders are added by the designer, the occluder can be placed coplanar with a set of adjacent polygons. This is unique because it allows the designer to use co-occlusion with the same simple occluder algorithm.

Figure 6C:
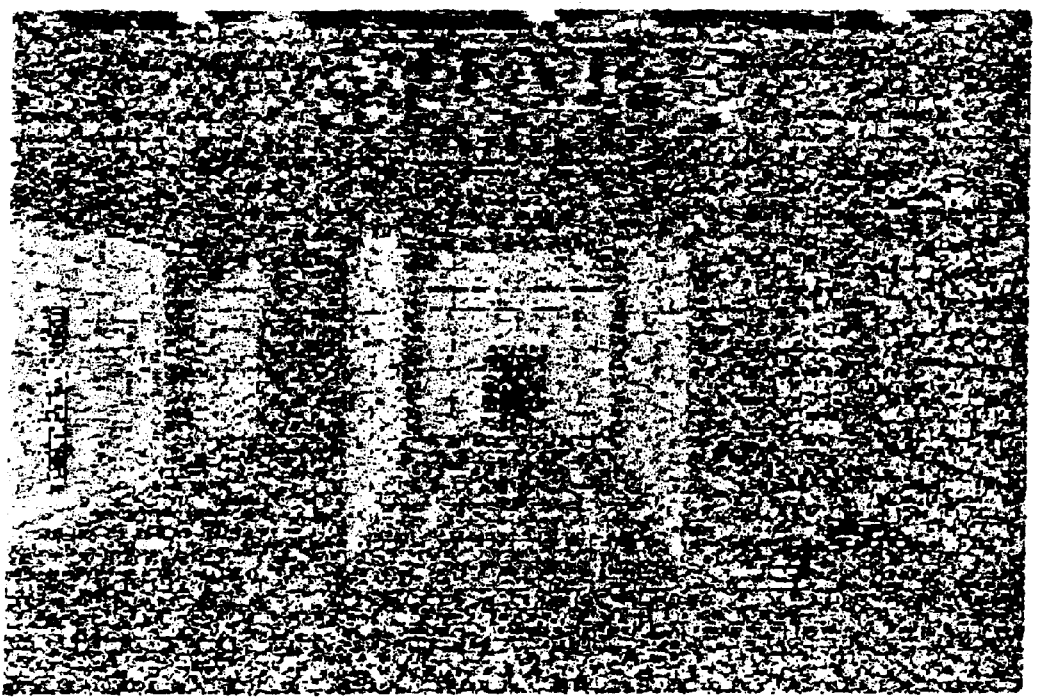
FIG. 6c is an image that illustrates an image from inside a world is identical whether or not the occluder is visible, and where the occluder shown in FIGS. 6a and 6b is just behind the far wall according to the invention.

FIG. 6 shows Quake Start Level (textures and scene data copyright IdSoftware, modified and screen captured with permission). The transparent plane highlights the location of the invisible occluder (FIG. 6a). In this figure, the occluder is not active and thus the geometry behind the occluder is visible. In FIG. 6b, the occluder is now active and the geometry behind the occluder is no longer visible. In FIG. 6c, the image from inside the world is identical whether or not the occluder is visible. In this scene, the occluder shown in FIGS. 6a and 6b is just behind the far wall. There are also occluders along the interior walls on the left and right, and below the floor.

Region based Scene Division

Breaking the scene into regions or cells is an effective way to reduce rendering overhead. This technique is already being used in VRML avatar worlds in which users warp between regions. Algorithms for incorporating region based scene division have been proposed (see B. Roehl, Adding Regions to VRML, University of Waterloo, Internet: WWW http://ece.uwaterloo.ca/~broehl/vrml/regions.html (Released Aug. 8, 1996)); and implemented (see D. Luebke, C. Georges, *Portals and Mirrors: Simple, Fast Evaluation of Potentially Visible Sets,* Proceedings of the 1995 Symposium on Interactive 3-D Graphics, ACM Press (April 1995)) using information about regions in a scene, but no generalized technique exists. Using the activationDistance field, an occluder can accomplish the task easily. Unlike prior art systems, the occluder does not restrict the types of scenes that can be created or the manner in which the regions are divided.

For example, one way to use the invention is to place occluders between each room in a multi-user environment. The designer can then set the activationDistance such that the room, and each adjacent room is visible, but all other rooms are not visible because the occluders are far enough away that they are actively occluding the farther rooms. Then, when the observer moves to another room, the relative occluder distances change and again the adjacent rooms are visible, and the rooms farther away are not. If each room is designed to be part of one hierarchical bounding box, culling can be performed quickly.

This technique is illustrated in FIG. 7. By combining the mapping of textures to occluders with region based division, one can focus the rendering on the near geometry. Far geometry is occluded and represented by the texture. The activationDistance for each occluder is set such that when the camera is in a region, the adjacent regions are rendered, and the farther regions are represented by the textured occluder.

Figure 7A:
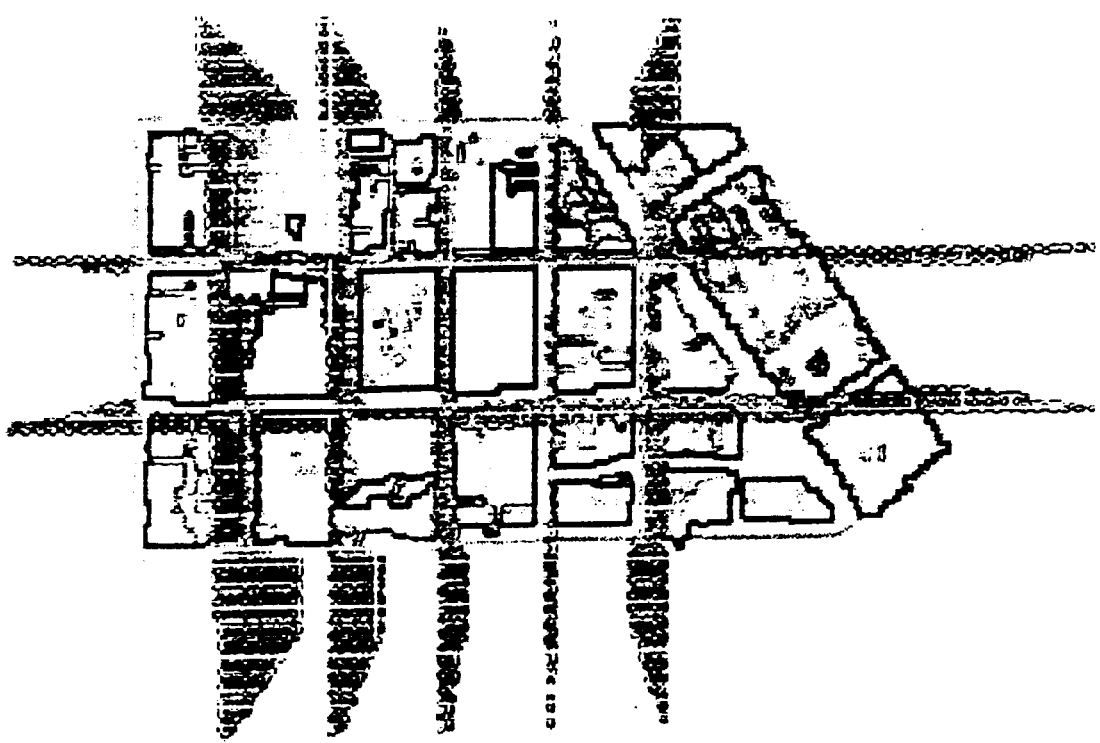
FIG. 7a is an image taken from Virtual Union Square, in which transparent planes show the position of the occluders, where the occluders are spaced such that they form distinct regions according to the invention.
Figure 7B:
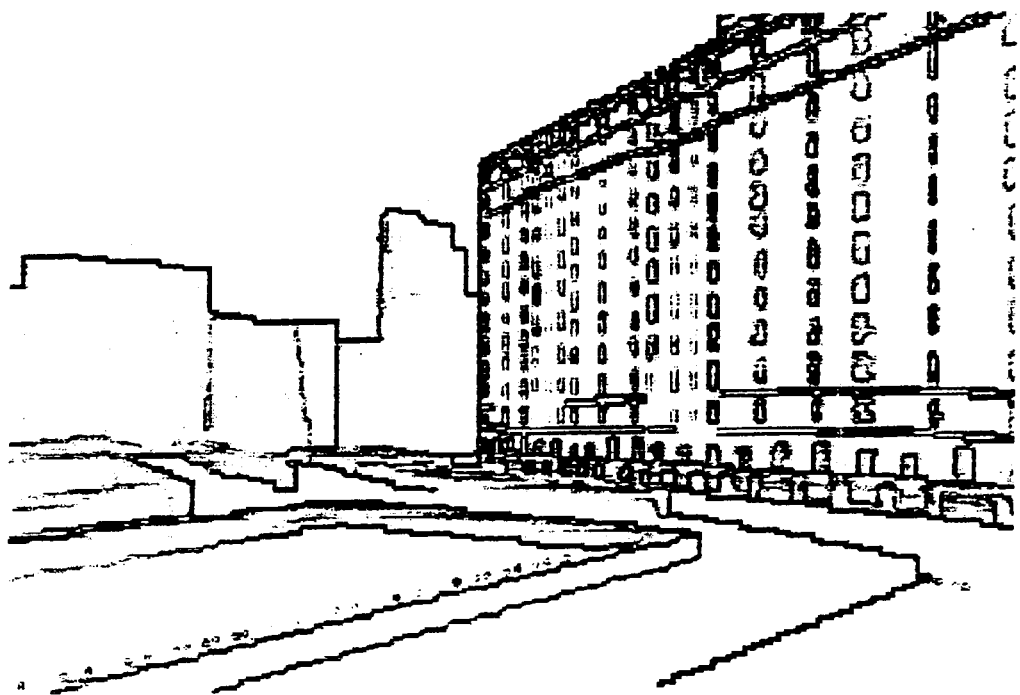
FIG. 7b is an image in which the original scene presented in FIG. 7a is shown without occluders according to the invention.
Figure 7C:
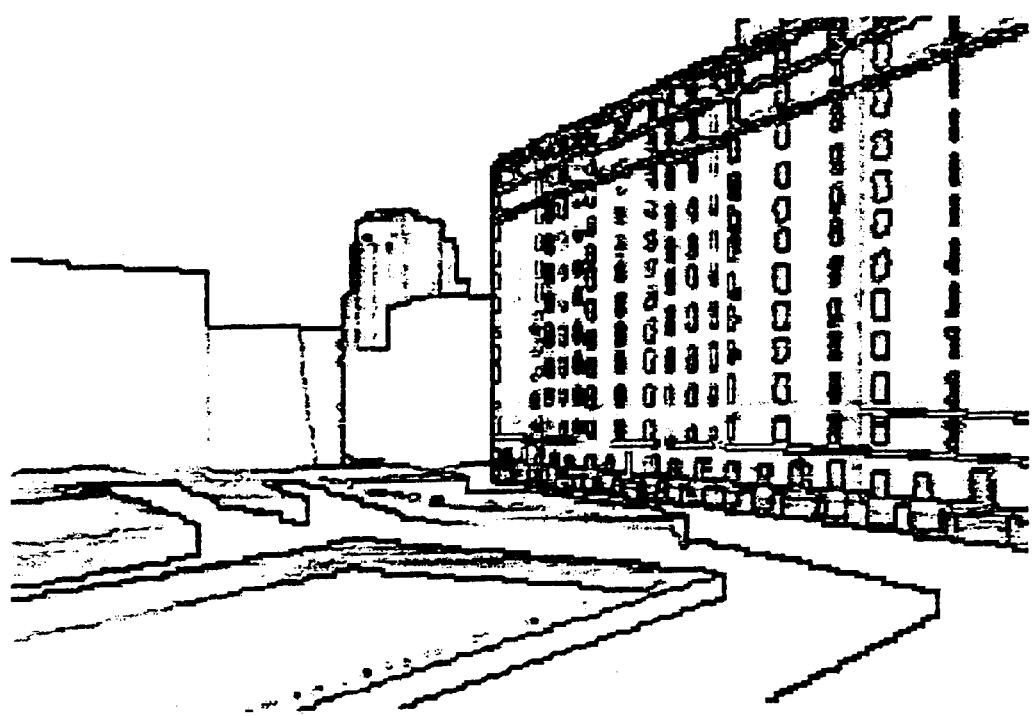
FIG. 7c is an image in which the scene presented in FIG. 7a is rendered with occluders using automatic texture mapping and an activationDistance corresponding to the size of a cell according to the invention.

The image in FIG. 7 is taken from Virtual Union Square (copyright Planet 9 Studies, modified and screen captured by permission). In FIG. 7a, the transparent planes show the position of the occluders. The occluders are spaced such that they form distinct regions. In FIG. 7b, the original scene is shown without occluders. In FIG. 7c, the scene has now been rendered with occluders using automatic texture mapping and an activationDistance corresponding to the size of a cell. The only perceptible difference is a slight shift in one building in the background, which is now an image, not true geometry as in FIG. 7b. This is due to the fact that the image does not accurately represent perspective distortion, as one would expect.

Static Display of Far Distance Geometry

One technique for achieving performance gains in large, open scenes, such as a park or a landscape is to note that distant objects change very slowly. If the objects are far enough, then that change is barely perceptible. Consequently, instead of rendering those far distance objects each time, the designer could use the mapTexture capability (see R. W. F. Xiong, *A Stratified Rendering Algorithm for Virtual Walkthroughs of Large Environments,* M. S. Thesis, Massachusetts Institute of Technology (1996)). By automatically mapping that texture on to the occluder, one can generate a visually appealing scene at interactive rates. By combining this technique with the technique described above (regions based scene division) extremely large spaces can be navigated.

Figure 8A:
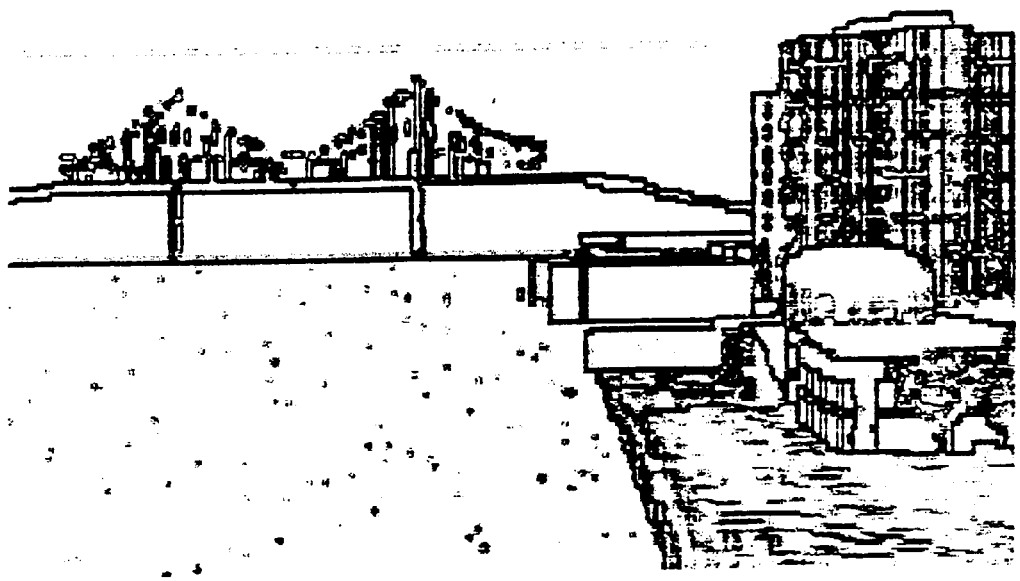
FIG. 8a is an image in which a rendered scene is shown without an occluder according to the invention.
Figure 8B:
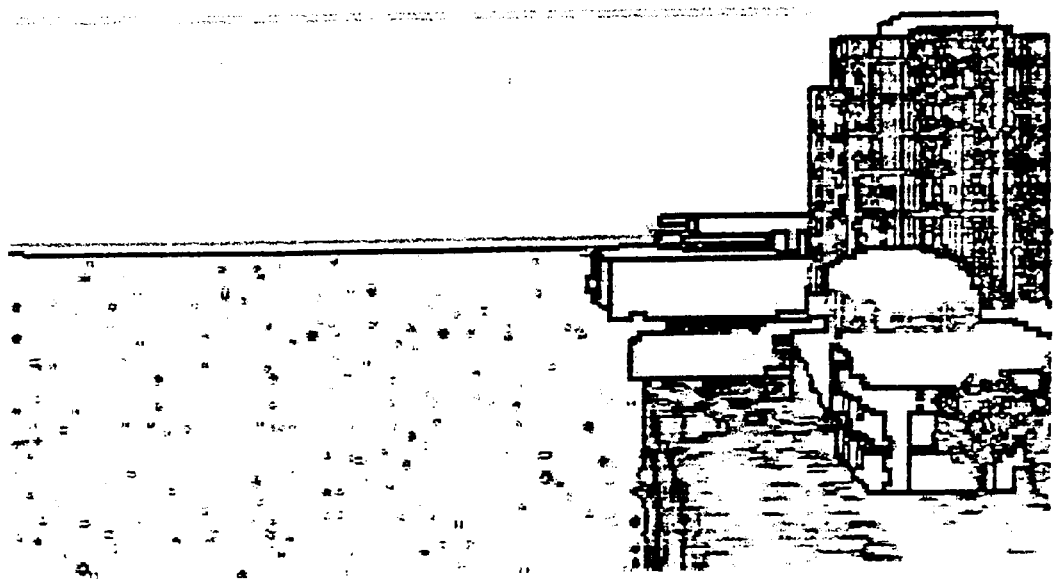
FIG. 8b is an image in which an occluder has been added, but automatic mapping of textures is disabled according to the invention.
Figure 8C:
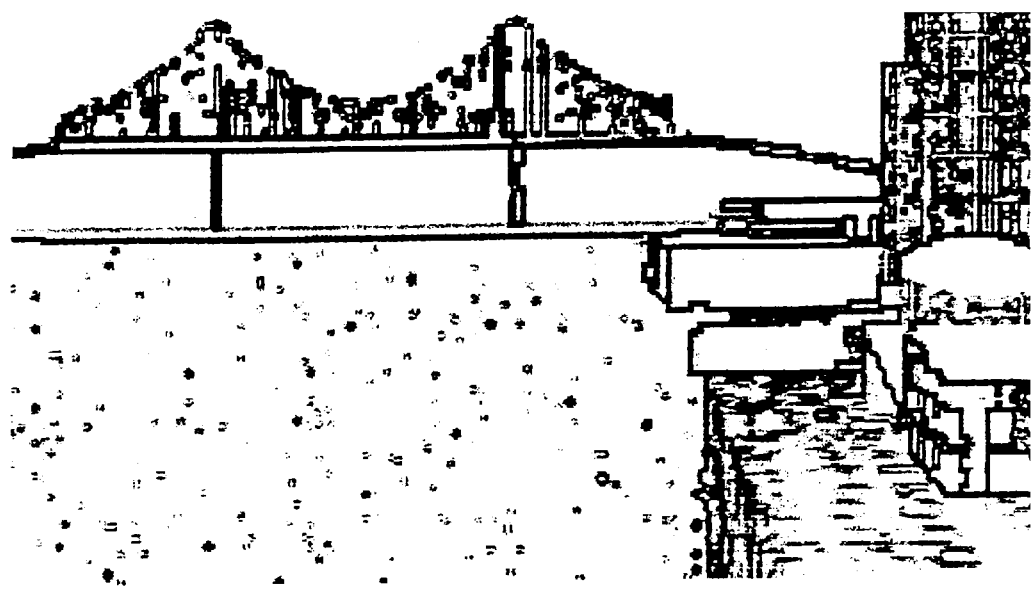
FIG. 8c, is an image in which a texture is mapped to an occluder, such that an image of the bridge shown in FIG. 8a appear according to the invention.

This technique is used to avoid the overhead of rendering the bridge shown in FIG. 8a. The rectangle in the scene shows the location of the occluder. Placing an occluder in front of the bridge effectively prevents the bridge from being rendered, as seen in FIG. 8b. Enabling the automatic texturing of the occluder, permits display of a static image of the bridge that is visually unnoticeable from a far distance (FIG. 8c). A very close look shows slight inaccuracies in the perspective between FIG. 8a and 8c, which is what one would expect.

By setting the activationDistance to a reasonable value, the occluder is no longer active and the geometry appears when the camera gets close enough to the bridge that the image is not a valid representation.

FIG. 8a is an image from Virtual New Orleans (copyright Planet 9 Studios, modified and screen captured with permission). The rectangle shows the position of the occluder. In FIG. 8a, the rendered scene is shown without an occluder. In FIG. 8b, the occluder has been added, but automatic mapping of textures is disabled. In FIG. 8c, by mapping a texture to the occluder, an image of the bridge appears. The fact that this image is nearly identical to that shown in FIG. 8a illustrates the effectiveness of this technique for far distant geometry.

Figure 9:
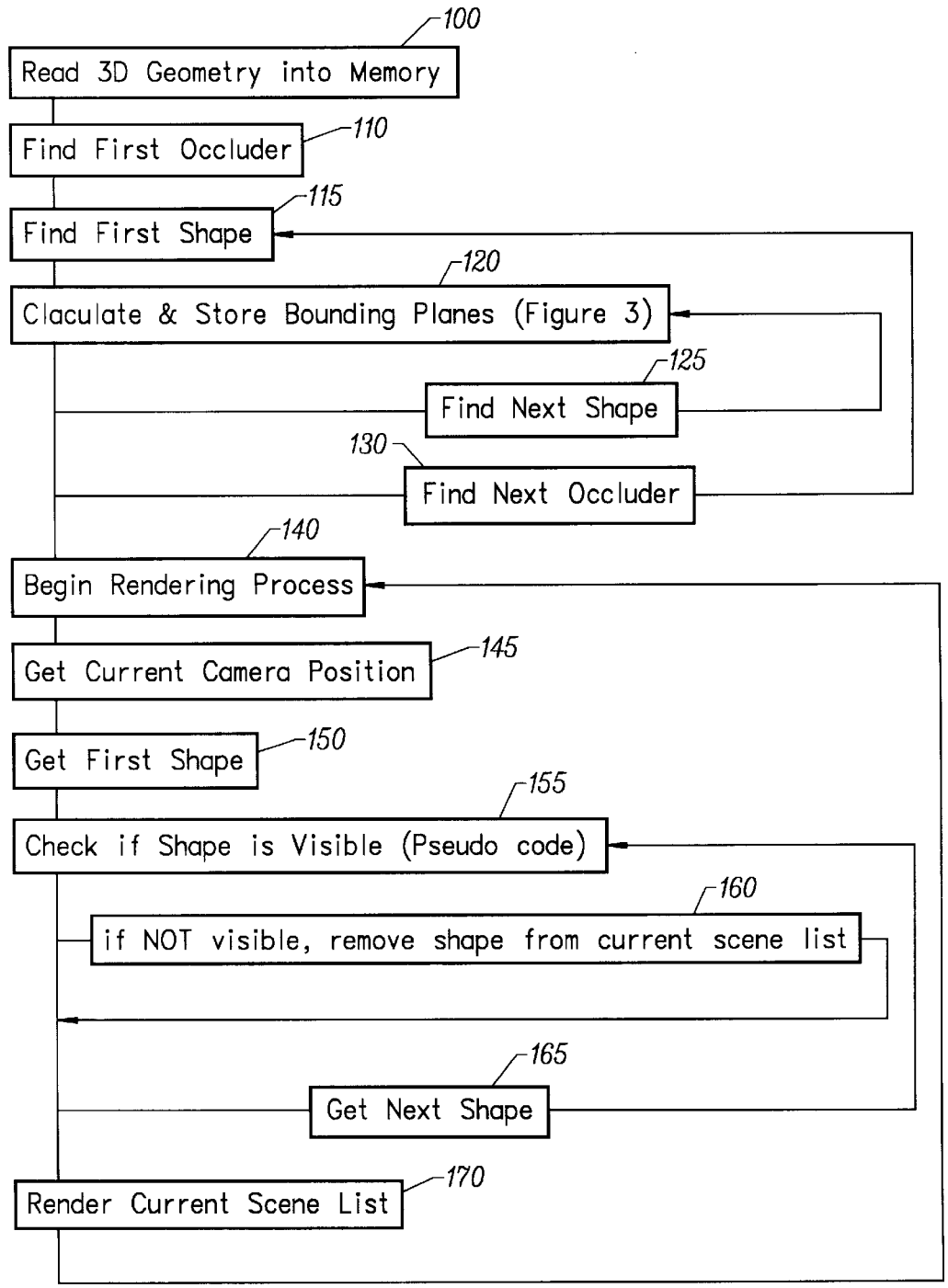
FIG. 9 is a flow diagram that illustrates the use of occluders as part of an image rendering procedure according to the invention.

FIG. 9 is a flow diagram that illustrates the use of occluders as part of an image rendering procedure according to the invention. In this example, a three dimensional image is read into system memory (100). The system then finds the first occluder (110) and finds the first shape (115). Bounding planes are calculated and stored (120), as discussed above in connection with FIG. 3. The next shape is then found (125) and bounding planes are again calculated and stored (120) until all shapes have been processed. The next occluder is then found (130) and the process repeats as above until all shapes have been processed for all occluders.

Thereafter, the rendering process is begun (140). The current camera position is first obtained (145) and then the first shape is obtained (150). The shape is checked to determine if it is visible (155), in accordance with the algorithm described above. If the shape is not visible (160), the shape is removed from the current scene list. The next shape is then obtained (165) and the process repeats until each shape has been examined for its visibility in the scene. Thereafter, the current scene list is rendered (170) and the rendering process continues (140).

Figure 10:
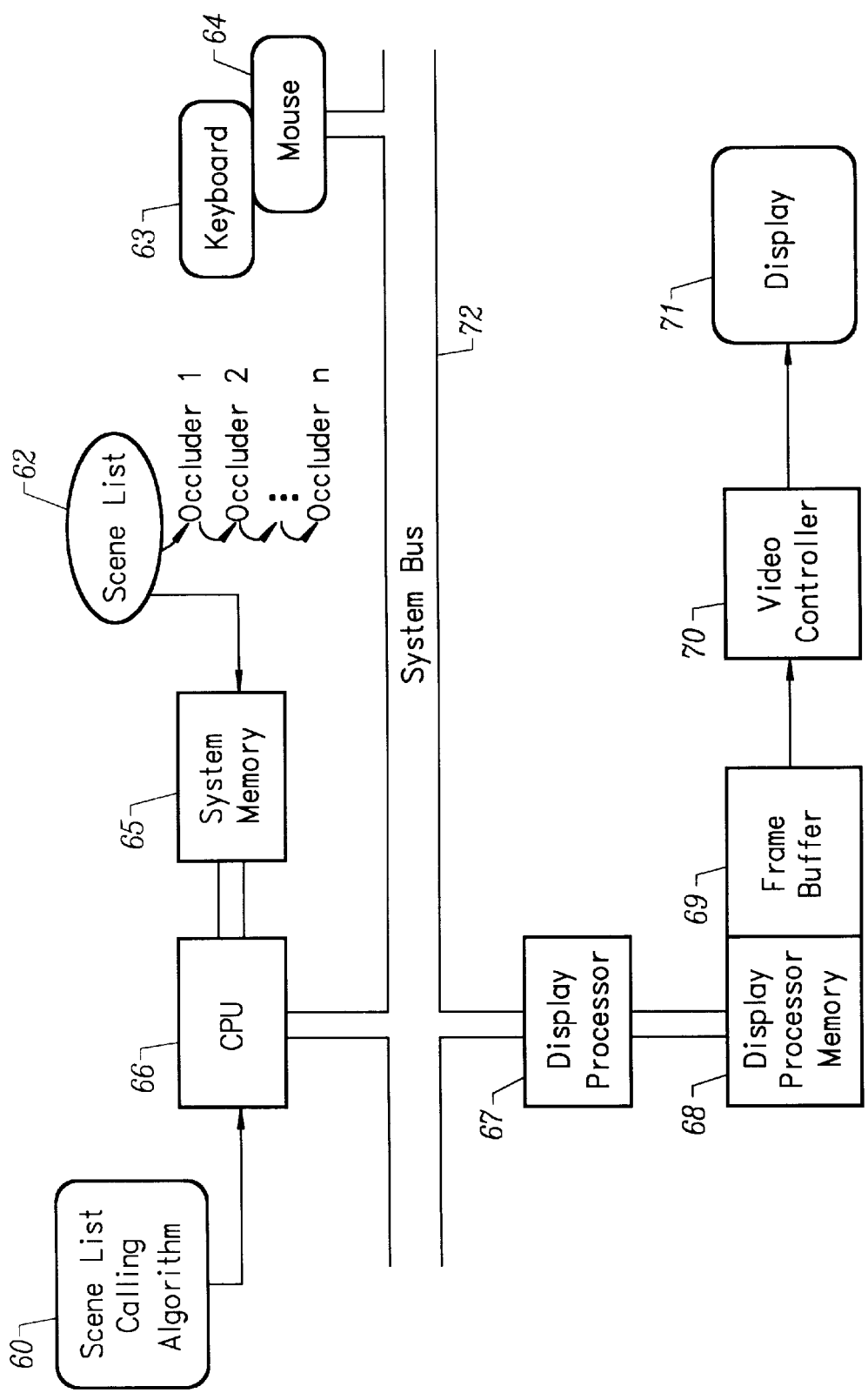
FIG. 10 is a block schematic diagram of an apparatus for providing simple generalized conservative visibility according to the invention.

FIG. 10 is a block schematic diagram of an apparatus for providing simple generalized conservative visibility according to the invention. FIG. 10 shows a system architecture, in which a CPU 66 applies the scene list culling algorithm 60 (described above) to a scene list 62 comprising occluders 1-n, as stored in system memory 65. User operation of the system is effected by such devices as a keyboard 63 or a mouse 64, in communication with the CPU via a system bus 72. The processed scene list is communicated from the CPU 66 to a display processor 67 via the system bus. The display processor operates in connection with a display processor memory 68 to assemble a display frame in a frame buffer 69. The frame is then written to a display 71 via a video controller 70.

Results

The presently preferred embodiment of the invention was tested with a commercial rendering engine and already existing VRML worlds to prove the generality of the algorithm. The rendering engine used, RenderWare, did not use information about object visibility as efficiently as possible (if 100% of the world is occluded, rendering still takes time, even though there is nothing to render). Accordingly, a better algorithm was implemented which is referred to as the optimized engine. Initial testing shows that one can expect to achieve up to an 8× to 10× performance increase with a rendering engine optimized to use information about objects that are not visible.

The tables below describe the results that were obtained. All testing was done in Windows NT on a Pentium Pro 200 with 64 MB of RAM. The same scenes as those presented above were used, and rendering data were gathered from the same regions where the above figures were captured. The tests focused on testing in regions where the VRML scene was complicated and visually appealing instead of regions where occluders were most effective. Thus, these statistics give reasonable estimates of the average performance improvement throughout the scene.

TABLE 1

Scene Statistics and Rendering Performance without Occluders

| Scene Name | Polygon Count | Vertex Count | Object Count | Average Render Time (Commercial) (ms) | Average Render Time (Optimized) (ms) | Average FPS (Commercial) | Average FPS (Optimized) |
|---|---|---|---|---|---|---|---|
| Quake Start Level (FIG. 6) | 13756 | 72333 | 2702 | 950 | 880 | 1.05 | 1.1 |
| Virtual Union Square (FIG. 7) | 12150 | 9638 | 132 | 170 | 135 | 5.9 | 7.5 |
| Virtual New Orleans (FIG. 8) | 15910 | 20426 | 371 | 130 | 100 | 7.7 | 10.0 |

TABLE 2

Rendering Performance for Commercial Three Dimensional Rendering Engine

| Scene Name | Number of Occluders in Scene | Average Number of Objects Occluded | Average Time for Occlusion Testing (ms) | Average Time to Render (ms) | Average Total Rendering Time (ms) | Average FPS (ms) |
|---|---|---|---|---|---|---|
| Quake Start Level (FIG. 6) | 8 | 2080 | 60 | 350 | 410 | 2.4 |
| Virtual Union Square (FIG. 7) | 12 | 105 | 3 | 130 | 133 | 7.5 |
| Virtual New Orleans (FIG. 8) | 1 | 1 | 15 | 54 | 69 | 14.5 |

TABLE 3

Rendering Performance for Rendering Engine Optimized to Use Object Visibility Information

| Scene Name | Number of Occluders in Scene | Average Number of Objects Occluded | Average Time for Occlusion Testing (ms) | Average Time to Render (ms) | Average Total Rendering Time (ms) | Average Frames per Second |
|---|---|---|---|---|---|---|
| Quake Start Level (FIG. 6) | 8 | 2080 | 60 | 290 | 350 | 2.9 |
| Virtual Union Square (FIG. 7) | 12 | 105 | 3 | 95 | 98 | 10.2 |
| Virtual New Orleans (FIG. 8) | 1 | 1 | 15 | 50 | 65 | 15.4 |

TABLE 4

Rendering Performance Summary for Occluders

| Scene Name | Performance Increase with Occluders (Commercial Engine) | Performance Increase with Occluders (Optimized Engine) | Occluders in Optimized Engine vs. No-occluders in Commercial Engine |
|---|---|---|---|
| Quake Start Level (FIG. 6) | 230% | 251% | 270% |
| Virtual Union Square (FIG. 7) | 130% | 138% | 170% |
| Virtual New Orleans (FIG. 8) | 188% | 153% | 200% |

On average, a 150 to 200 percent performance increase is achieved through the use of well positioned occluders. These results were achieved even though the underlying rendering engine does not effectively take advantage of information about which objects are visible. The optimized engine shows improved performance, but even this implementation is not nearly as optimal as it could have been. A 200% improvement greatly helps the interactivity of current scenes and opens the doors for larger more interactive environments.

Other Embodiments

An algorithm for automatically placing occluders in a scene may be provided in accordance with the invention herein. This algorithm may be incorporated by companies creating scene authoring tools. Alternative algorithms that can achieve constant space requirements instead of the current requirements of storing four normals per object per occluder may be provided. The algorithm may be extended to be able to account for adjacent occluders in the scene and effectively determine which objects are not fully occluded by either one, but are fully occluded by both. Another embodiment of the invention allows designers to put portals in large occluders. Because each object is tested individually against its own occlusion volume, the algorithm is highly parallelizable.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for providing simple generalized conservative visibility, comprising the steps of:

providing one or more occluder nodes, wherein said one or more occluder nodes are planes having a given width and height in object space that block the rendering of objects behind them in world space;

providing an activationDistance field which specifies how far a camera must be from an occluder node for said occluder node to be active;

using said one or more occluder nodes to compute a conservative set of visible objects from a current view point; and rendering said conservative set of visible objects.

2. The method of claim 1 wherein said one or more occluder nodes are used for any one or more of culling geometry in densely occluded models, region based scene division, and using images to represent far distant geometry.

3. The method of claim 1, wherein said one or more occluder nodes are positioned relative to object bounding boxes to effect partial or total occlusion of objects within said bounding boxes.

4. The method of claim 1, wherein said one or more occluder nodes are defined as a plane in world space having a given center, width, height, and normal, wherein an object is considered occluded if an object lies in a positive half space of an occluder node, and an entire object bounding box lies within an area of said occluder node in world space.

5. The method of claim 4, wherein an object is not visible from a camera position if and only if all vertices of its bounding box are occluded by a single occluder node in camera space.

6. The method of claim 5, wherein each object's bounding box can exist in any of three states relative to an occluder, including wherein said bounding box is completely unobstructed by said occluder, in which case said object is visible to said camera; where said bounding box is partially occluded by said occluder, in which case said object is partially visible to said camera; and wherein said bounding box is completely occluded by said occluder, in which case said object is not visible to said camera.

7. The method of claim 1, wherein the following fields are provided in an occluder node:

EXTERNPROTO Occluder [
exposedField SFBool active
field SFFloat height
field SFFloat width
field SFFloat activation Distance
].

8. The method of claim 1, further comprising the step of:
providing a Boolean field which controls whether or not said one or more occluder nodes is active in a scene.

9. The method of claim 1, wherein a VRML prototype for an occluder node is:

EXTERNPROTO Occluder [
field SFFloat height
field SFFloat width
exposedField SFBool active
].

10. The method of claim 1, wherein an affine transformation can be applied to an occluder node, such that said occluder can be transformed to any position in world space.

11. The method of claim 1, further comprising the step of:
placing an occluder node coplanar with other geometry, wherein occluder nodes are added to scenes after a scene has been completely designed without changing the visual appearance of said scene.

12. The method of claim 1, further comprising the step of:
altering the number of occluder nodes in a scene to optimize said method.

13. The method of claim 1, further comprising the step of:
automatically generating and mapping a texture of a scene behind an occluder onto a face of said occluder.

14. The method of claim 13, wherein said occluder's texture is replaced by real geometry when a camera is closer to said occluder than an activationDistance, wherein generation of said texture is accomplished by rendering geometry behind said occluder into an image buffer that is used as a texture for said occluder.

15. The method of claim 1, further comprising the step of:
using hierarchical bounding boxes in a scene to take advantage of spacial locality of objects to determine their visibility quickly.

16. The method of claim 1, further comprising the step of:
providing hierarchical bounding boxes, wherein all bounding boxes which are completely inside an occluded bounding box are occluded.

17. The method of claim 16, further comprising the steps of:
maintaining a set of normals comprising occluder volumes for each object in a scene, wherein a set of normals comprising occluder volumes for said hierarchical bounding boxes at each group node in a tree are also maintained, wherein if a bounding box at a parent node in said tree is occluded, then all of its progeny are also occluded; and wherein if said parent is not occluded, then said progeny are checked individually.

18. The method of claim 1, further comprising the step of:
placing occluders in a same position as objects that already block much of a scene.

19. The method of claim 1, further comprising the step of:
breaking a scene into regions or cells to reduce rendering overhead.

20. The method of claim 1, further comprising the steps of:
placing occluders between each room in a multi-user environment; and
setting an activationDistance such that a particular room, and each adjacent room is visible, but all other rooms are not visible because occluders are far enough away that they are actively occluding said other rooms, wherein when an observer moves to another room, relative occluder distances change and again said adjacent rooms are visible, and rooms farther away are not.

21. The method of claim 1, wherein said one or more occluder nodes is represented as a one dimensional line, and an object is represented as a two dimensional bounding square in a two dimensional case.

22. The method of claim 21, further comprising the steps of:
calculating bounding planes which form a bounding volume in which said object is occluded; and
testing if a camera is inside an occlusion volume associated with an object, such that said object is visible to said camera, wherein an object not visible to said camera is not rendered.

23. The method of claim 22, wherein the step of calculating bounding volume further comprises the step of:
transforming all objects from world space coordinates into a coordinate space relative to said occluder node.

24. The method of claim 23, wherein for each occluder in said scene, normals representing said occlusion volume are stored with said object by associating a linked list of bounding volume normals with each shape node in a scene graph.

25. The method of claim 24, wherein a linked list is created of pointers to occluder nodes in said scene graph to locate occluders quickly.

26. The method of claim 25, further comprising the steps of:
determining whether or not an object is visible by traversing said scene graph to find each object containing a set of occlusion volumes; and
looping through each of said occlusion volumes;
wherein said object is not visible and visibility is set to false if a camera is inside one of said occlusion volumes, where said camera position is in a positive half space of said occluder, top, left, bottom, and right planes.

27. The method of claim 26, wherein said determining step is performed in accordance with the following algorithm:

```
for each object in scene graph do
    object.visible = true
    if object.volumes != NULL then for each occlusion_volume in
        object do
    if distance(camera_position, occluder) < 0 then continue
    if distance(camera_position, top_bounding_plane) < 0 then
        continue
    if distance(camera_position, left_bounding_plane) < 0 then
        continue
    if distance(camera_position, bottom_bounding_plane) < 0 then
        continue
    if distance(camera_position, right_bounding_plane) < 0 then
        continue
    object.visible = false
    return
    next
    endif
next.
```

28. The method of claim 21, further comprising the step of:

calculating bounding lines between an occluder node and said object, wherein the intersection of an area on an opposite side of said occluder from said object and an area in between said bounding lines represents an area in which said object is fully occluded.

29. The method of claim 22, comprising the steps of:

computing each occlusion volume in which a camera cannot see an object because said object is blocked by an occluder as a onetime initialization process at run time; and for each frame, looping over all of said occlusion volumes;

wherein an object associated with an occlusion volume is not visible if said camera is inside said occlusion volume.

30. A method for providing simple generalized conservative visibility, comprising the steps of:

reading scene description data into system memory;

obtaining a current camera position;

finding a first occluder wherein said first occluder is a plane having a given width and height in object space that blocks the rendering of objects behind the occluder in world space, and wherein said occluder is used to compute a conservative set of visible objects from a current view point;

obtaining a first shape;

checking the bounding box of said shape to determine if it is visible to said camera;

removing said shape from a current scene list if said shape is not visible to said camera;

providing an activationDistance field which specifies how far a camera must be from an occluder for said occluder to be active;

calculating and storing bounding planes;

obtaining a next shape;

repeating until each shape has been examined for its visibility in a scene;

calculating and storing bounding planes until all shapes have been processed;

finding a next occluder;

repeating until all shapes have been processed for all occluders; and rendering said current scene list.

31. An apparatus for providing simple generalized conservative visibility, comprising:

a programmable machine including a display for viewing at least one object; and a processor;

said processor defining at least one occluder node, wherein said at least one occluder node comprises a plane having a given width and height in object space that blocks the rendering of objects behind it in world space;

said processor calculating bounding planes which form a bounding volume in which said object is occluded;

said processor testing if a camera is inside an occlusion volume associated with an object, such that said object is visible to said camera, wherein an object not visible to said camera is not rendered;

wherein said at least one occluder node is used by said processor to compute a conservative set of visible objects from a current view point for viewing on said display;

providing an activationDistance field which specifies how far a camera must be from an occluder node for said occluder node to be active; and said processor rendering a conservative set of visible objects.

32. The apparatus of claim 31, wherein said at least one occluder node is used for any one or more of culling geometry in densely occluded models, region based scene division, and using images to represent far distant geometry.

33. The apparatus of claim 31, wherein said at least one occluder node is positioned relative to bounding boxes to effect partial or total occlusion of objects within said bounding box.

34. The apparatus of claim 31, wherein said at least one occluder node is defined as a plane in world space having a given center, width, height, and normal, wherein an object is considered occluded if an object lies in a positive half space of an occluder node, and an entire object bounding box lies within an area of said occluder node in world space.

35. The apparatus of claim 34, wherein an object is not visible from a camera position if and only if all vertices of its bounding box are occluded by a single occluder node in camera space.

36. The apparatus of claim 35, wherein each object's bounding box can exist in any of three states relative to an occluder node, including wherein said bounding box is completely unobstructed by said occluder node, in which case said object is visible to said camera; where said bounding box is partially occluded by said occluder node, in which case said object is partially visible to said camera; and wherein said bounding box is completely occluded by said occluder node, in which case said object is not visible to said camera.

37. The apparatus of claim 31, further comprising:

a Boolean field which controls whether or not said at least one occluder node is active in a scene.

38. The apparatus of claim 31, wherein an affine transformation can be applied to an occluder node, such that said occluder can be transformed to any position in world space.

39. The apparatus of claim 31, further comprising:

an occluder node that is placed coplanar with other geometry, wherein an occluder node may be added to scenes after a scene has been completely designed without changing the visual appearance of said scene.

40. The apparatus of claim 31, further comprising:

means for automatically generating and mapping a texture of a scene behind an occluder onto a face of said occluder.

41. The apparatus of claim 31, further comprising:

hierarchical bounding boxes, used in a scene, to take advantage of spacial locality of objects to determine their visibility quickly.

42. The apparatus of claim 31, further comprising:

hierarchical bounding boxes, wherein all bounding boxes which are completely inside an occluded bounding box are occluded.

43. The apparatus of claim 42, further comprising:

a set of normals comprising occluder volumes for each object in a scene, wherein a set of normals comprising occluder volumes for said hierarchical bounding boxes at each group node in a tree are also maintained, wherein if a bounding box at a parent node in said tree is occluded, then all of its progeny are also occluded; and wherein if said parent is not occluded, then said progeny are checked individually.

44. The apparatus of claim 31, wherein said at least one occluder node is represented as a one dimensional line, and an object is represented as a two dimensional bounding square in a two dimensional case.

45. The method of claim 44, further comprising:

means for transforming all objects from world space coordinates into a coordinate space relative to said occluder node.

46. The apparatus of claim 45, wherein for each occluder in said scene, normals representing occlusion volume are stored with said object by associating a linked list of bounding volume normals with each shape node in a scene graph.

47. The apparatus of claim 46, further comprising:

a linked list of pointers to occluder nodes in said scene graph for locating occluders quickly.

48. An apparatus for providing simple generalized conservative visibility, comprising:

a system memory into which scene description data may be read; and a processor;

said processor defining a first occluder, wherein said first occluder is a plane having a given width and height in object space that blocks the rendering of objects behind the occluder in world space, and wherein said occluder is used to compute a conservative set of visible objects from a current view point;

an activationDistance field which specifies how far a camera must be from an occluder for said occluder to be active;

said processor executing an algorithm to:

obtain a current camera position;

obtain a first shape;

calculate and store bounding planes;

check the bounding box of said shape to determine if it is visible to said camera;

remove said shape from a current scene list if said shape is not visible to said camera;

obtain a next shape and calculate and store bounding planes until all shapes have been processed;

find a next occluder;

repeat until all shapes have been processed for all occluders and each shape has been examined for its visibility in a scene; and render said current scene list.

\* \* \* \* \*